(12) United States Patent
Park et al.

(10) Patent No.: US 11,493,936 B2
(45) Date of Patent: Nov. 8, 2022

(54) PLATOONING MANAGEMENT DEVICE, SYSTEM INCLUDING THE SAME, AND METHOD THEREOF

(71) Applicants: Hyundai Motor Company, Seoul (KR); Kia Motors Corporation, Seoul (KR)

(72) Inventors: Hong Gi Park, Seoul (KR); Sang Yeob Lee, Gyeonggi-do (KR); Il Hwan Kim, Gyeonggi-do (KR); Seung Hyun Kim, Seoul (KR); Dong Hyuk Kim, Gyeonggi-do (KR); Kyung Joo Bang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 389 days.

(21) Appl. No.: 16/774,769

(22) Filed: Jan. 28, 2020

(65) Prior Publication Data
US 2021/0064060 A1 Mar. 4, 2021

(30) Foreign Application Priority Data
Aug. 27, 2019 (KR) .................. 10-2019-0105429

(51) Int. Cl.
*G05D 1/02* (2020.01)
*G06Q 20/40* (2012.01)
*G08G 1/00* (2006.01)
*G06Q 10/06* (2012.01)

(52) U.S. Cl.
CPC ..... *G05D 1/0295* (2013.01); *G06Q 10/06316* (2013.01); *G06Q 20/405* (2013.01); *G08G 1/22* (2013.01)

(58) Field of Classification Search
CPC .......... G05D 1/0295; G06Q 10/06316; G06Q 20/405; G06Q 1/22
See application file for complete search history.

(56) References Cited

U.S. PATENT DOCUMENTS

| | | | |
|---|---|---|---|
| 2016/0362022 A1* | 12/2016 | Mathews, Jr. | .......... G06F 17/10 |
| 2018/0018605 A1 | 1/2018 | Light-Holets et al. | |
| 2020/0027355 A1* | 1/2020 | Sujan | .................. G05D 1/0295 |
| 2020/0361503 A1* | 11/2020 | Teshima | ................. B61L 27/04 |

FOREIGN PATENT DOCUMENTS

| | | | | |
|---|---|---|---|---|
| EP | 3591637 A1 * | 1/2020 | ....... | G06Q 10/06315 |
| WO | WO-2018035145 A1 * | 2/2018 | .............. | G05D 1/02 |
| WO | WO-2019117795 A1 * | 6/2019 | ............ | B60W 30/10 |

* cited by examiner

*Primary Examiner* — Calvin Cheung
(74) *Attorney, Agent, or Firm* — Fox Rothschild LLP

(57) ABSTRACT

A platooning management device, a vehicle system including the same, and a method thereof are provided. The platooning management device includes a processor that calculates driving costs of vehicles in a platooning line, and compares the driving costs of the vehicles to determine whether it is necessary to change a location of a leading vehicle in the platooning line. When it is necessary to change the location, the processor performs location change control. A storage stores driving costs obtained by the processor and information received from the vehicles in the platooning line.

18 Claims, 6 Drawing Sheets

PLATOONING MANAGEMENT DEVICE, SYSTEM INCLUDING THE SAME, AND METHOD THEREOF

CROSS-REFERENCE TO RELATED APPLICATION

This application is claims the benefit of priority to Korean Patent Application No. 10-2019-0105429, filed on Aug. 27, 2019, the entire contents of which are incorporated herein by reference.

TECHNICAL FIELD

The present disclosure relates to a platooning management device, a system including the same, and a method thereof, and more particularly, relates to technologies of managing costs consumed between platooning vehicles.

BACKGROUND

Platooning is a method of exchanging movement and context information of a leading vehicle via real-time communication between vehicles and maintaining a certain interval with the leading vehicle to drive several vehicles together. Since following vehicles travel while maintaining the certain interval with the leading vehicle in such platooning, the platooning reduces air resistance of the following vehicles, thus saving fuel efficiency and reducing the risk of an accident.

In existing platooning methods, following vehicles have the fuel saving effect of 15-20% during platooning, whereas a leading vehicle has the lowest fuel saving effect of less than 10%. There is a tendency that driving costs of the leading vehicle is most used during platooning. Thus, there is a need for compensating for the driving costs of the leading vehicle, for example, for constructing a billing system, or averaging costs consumed by driving of platooning vehicles.

SUMMARY

The present disclosure provides a platooning management device for calculating driving costs of each of platooning vehicles and adjusting a platooning location of each of the platooning vehicles to equally spread driving costs among the platooning vehicles, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a platooning management device may include: a processor configured to calculate driving costs of vehicles in a platooning line, compare the driving costs of the vehicles to determine whether it is necessary to change a location of a leading vehicle in the platooning line, and perform location change control in response to determining it is necessary to change the location and a storage configured to store driving costs obtained by the processor and information received from the vehicles in the platooning line.

In an exemplary embodiment, the processor may be configured to calculate a level of contribution of platooning, a level of emergency of the platooning, which is an emergency degree, fuel efficiency of the platooning, and risk of the platooning and may be configured to calculate the driving costs based on at least one of the level of contribution, the level of emergency, the fuel efficiency, and/or the risk. In addition, the processor may be configured to calculate the level of contribution of the platooning based on the entire platooning time and a driving time at the location of the leading vehicle.

The processor may be configured to calculate the level of emergency based on a distance drivable with current fuel of a host vehicle and a distance to need driving to a destination. In an exemplary embodiment, the processor may be configured to calculate the fuel efficiency based on a platooning distance and an amount of used fuel. The processor may be configured to evaluate at least one or more of a user state, a user qualification, and/or a penalty and may calculate the risk based on the evaluated result.

The user state may include at least one of whether a user drives while drowsy and/or whether the user establishes a call connection while driving. The user qualification may include at least one or more of a user history and/or a user accident history. The penalty may include a penalty point according to the number of times of denials of a request to drive at the location of the leading vehicle. In addition, the processor may be configured to calculate the driving costs using a total score of each of a level of contribution, a level of emergency, fuel efficiency, and risk, the driving costs being calculated by assigning a weight for each item to the level of contribution, the level of emergency, the fuel efficiency, and the risk and adding the level of contribution, the level of emergency, the fuel efficiency, and the risk.

In an exemplary embodiment, the processor may be configured to compare driving costs of the leading vehicle with driving costs of a following vehicle and request the following vehicle to change a driving location in the platooning line when the driving costs of the leading vehicle are greater than the driving costs of the following vehicle. The processor may be configured to request the following vehicle again to change the driving location in the platooning line after a predetermined time interval elapses, when receiving a denial of the request to change the driving location in the platooning line from the following vehicle.

The processor may be configured to change a mode of the following vehicle to a user manual control mode when receiving approval to the request for changing the driving location in the platooning line from the following vehicle, change a lane of the leading vehicle in a user manual mode or an automatic driving mode such that the leading vehicle coasts down, and may be configured to move the leading vehicle to the tail end of the platooning line to continue performing platooning.

According to another aspect of the present disclosure, a vehicle system may include: a platooning management device configured to calculate driving costs of vehicles in a platooning line, compare the driving costs of the vehicles to determine whether it is necessary to change a location of a leading vehicle in the platooning line, and perform location change control in response to determining it is necessary to change the location and a display configured to display a screen for requesting to change the location.

In an exemplary embodiment, the vehicle system may further include a communication device configured to perform communication between the vehicles in the platooning line and share platooning information. The display may be configured to receive approval from a user through the screen for requesting to change the location.

According to another aspect of the present disclosure, a platooning management method may include: calculating driving costs of vehicles in a platooning line, comparing the driving costs of the vehicles to determine whether it is necessary to change a location of a leading vehicle in the platooning line, and performing location change control, in response to determining it is necessary to change the location.

The performing of the location change control in response to determining it is necessary to change the location may include requesting a following vehicle which consumes driving costs lower than driving costs of the leasing vehicle to change a location of the following vehicle and moving the leading vehicle to the tail end of the platooning line, when receiving approval to the request for changing the location from the following vehicle.

The platooning management method may further include requesting the following vehicle again to change the driving location in the platooning line after a predetermined time interval elapses, when receiving a denial of the request for changing the location from the following vehicle. The moving of the leading vehicle to the tail end may include changing the following vehicle from an automatic mode to a user manual mode and changing a lane of the leading vehicle in a user manual mode or an automatic driving mode to operate the leading vehicle to coast down.

Further, the calculating of the driving costs may include calculating a level of contribution of platooning based on the entire platooning time and a driving time at the location of the leading vehicle, calculating a level of emergency based on a distance drivable with current fuel of a host vehicle and a distance to need driving to a destination, calculating fuel efficiency based on a platooning distance and an amount of used fuel, evaluating at least one or more of a user state, a user qualification, and/or a penalty and calculating risk based on the evaluated result, and calculating the driving costs based on at least one or more of the level of contribution, the level of emergency, the fuel efficiency, and/or the risk.

The determining of whether it is necessary to change the location may include comparing driving costs of the leading vehicle with driving costs of a following vehicle and requesting the following vehicle to change a driving location in the platooning line, when the driving costs of the leading vehicle are greater than the driving costs of the following vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
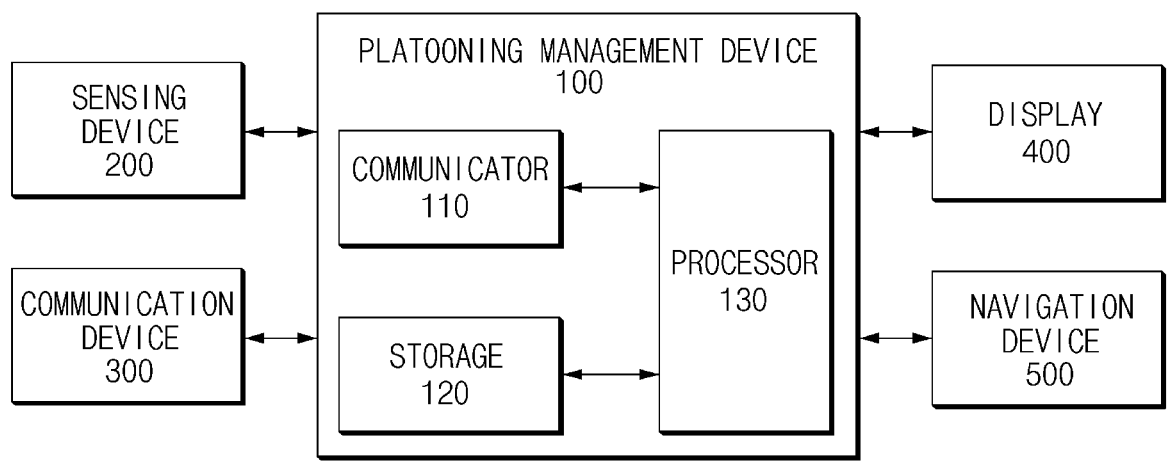
FIG. 1 is a block diagram illustrating a configuration of a vehicle system including a platooning management device according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An exemplary embodiment of the present disclosure discloses technologies of calculating driving costs of each of platooning vehicles during platooning and adjusting a platooning location such that each of the platooning vehicles is moved to a location of a leading vehicle (e.g., taking turns being the leading vehicle), thus equally spreading driving costs among the platooning vehicles.

Hereinafter, a description will be given in detail of exemplary embodiments of the present disclosure with reference to FIGS. 1 and 6. FIG. 1 is a block diagram illustrating a configuration of a vehicle system including a platooning management device according to an exemplary embodiment of the present disclosure. Referring to FIG. 1, the vehicle system according to an exemplary embodiment of the present disclosure may include a platooning management device 100, a sensing device 200, a communication device 300, a display 400, and a navigation device 500. Each of the devices may be operated by a controller.

The platooning management device 100 may be configured to calculate driving costs of respective vehicles in a platooning line and compare the driving costs of the respective vehicles to determine whether it is necessary to change a location of a leading vehicle in the platooning line. In response to determining it is necessary to change the location of the leading vehicle, the platooning management device 100 may be configured to perform location change control. The platooning management device 100 may include a communicator 110, a storage 120, and a processor 130.

The communicator 110 may be a hardware device implemented with various electronic circuits for transmitting and receiving a signal via wireless or wired connection. In an exemplary embodiment of the present disclosure, the communicator 110 may be configured to perform inter-vehicle communication via controller area network (CAN) communication, local interconnect network (LIN) communication, or the like and communicate with the sensing device 200, the communication device 300, the display 400, and the navigation device 500.

The storage 120 may be configured to store a sensing result of the sensing device 200, driving costs (e.g., a level of contribution, a level of emergency, fuel consumption, risk, and the like) or the like obtained by the processor 130, and information or the like received from another vehicle (e.g., a leading vehicle) in a platooning line. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communicator 110, the storage 120, or the like and may electrically operate the respective components. The processor 130 may be an electrical circuit which executes instructions of software and may perform a variety of data processing and calculation described below. The processor 130 may be configured to calculate driving costs of respective vehicles in a platooning line and compare the driving costs of the respective costs to determine whether it is necessary to change a location of a leading vehicle in the platooning line. In response to determining it is necessary to change the location of the leading vehicle, the processor 130 may be configured to execute the location change.

The processor 130 may be configured to calculate a level of contribution of platooning, a level of emergency of the platooning, which is an emergency degree, fuel efficiency of the platooning, and risk of the platooning and calculate driving costs based on at least one or more of the level of contribution, the level of emergency, the fuel efficiency, and the risk. In other words, the processor 130 may be configured to calculate driving costs using a total score of each of the level of contribution, the level of emergency, the fuel efficiency, and the risk. The processor 130 may be configured to calculate the driving costs by assigning a weight for each item to the level of contribution, the level of emergency, the fuel efficiency, and the risk and adding the level of contribution, the level of emergency, the fuel efficiency, and the risk to calculate driving costs.

Particularly, the processor 130 may be configured to calculate a level of contribution based on the entire platooning time and a driving time at the location of the host vehicle. Furthermore, the processor 130 may be configured to calculate a level of emergency based on a distance drivable with current fuel of the host vehicle and a distance to need driving to a destination. Furthermore, the processor 130 may be configured to calculate fuel efficiency using a platooning distance and an amount of used fuel. The processor 130 may then be configured to evaluate at least one or more of a user state, a user qualification, and/or a penalty and calculate risk based on the evaluated result. In particular, the user state may include at least one or more of whether a user drives while drowsy and/or whether the user establishes a call connection while driving (e.g., makes a phone call while operating the vehicle). The user qualification may include at least one or more of a user history and/or a user accident or collision history. The penalty may include a penalty point based on the number of times of denying a request to drive at the location of the leading vehicle.

The processor 130 may be configured to compare driving costs of the leading vehicle with driving costs of a following vehicle or each of the following vehicles. When the driving costs of the leading vehicle are greater than those of the following vehicle above a specific value, the processor 130 may be configured to request the following vehicle to change a driving location in a platooning line. In other words, the following vehicle may be requested to move into the leading vehicle position to thus adjust driving costs of the leading and following vehicles. When receiving a denial of the request for changing the driving location in the platooning line, the processor 130 may be configured to request the following vehicle again to change the driving location in the platooning line, after a predetermined time interval elapses.

Furthermore, when receiving approval for the request for changing the driving location in the platooning line from the following vehicle (e.g., the vehicle immediately behind the leading vehicle), the processor 130 may be configured to change a mode of the following vehicle to a user manual control mode, change a lane of the host vehicle in a user manual mode or an automatic driving mode such that the host vehicle coasts down (e.g., decelerates), and move the host vehicle to the tail end of the platooning line to continue performing platooning driving.

The sensing device 200 may include a plurality of sensors configured to sense objects outside the host vehicle, such as vehicles in front of and behind the host vehicle, during platooning, and may be configured to obtain information associated with a location of the object outside the host vehicle, a speed of the object outside the host vehicle, a movement direction of the object outside the host vehicle, and a type of the object outside the host vehicle (e.g., a vehicle, a pedestrian, a bicycle, a motorcycle, or the like). Accordingly, the sensing device 200 may include an ultrasonic sensor, a radar, a camera, a laser scanner and/or a corner radar, a light detection and ranging (LiDAR), an acceleration sensor, a yaw rate sensor, a torque sensor and/or a wheel speed sensor, a steering angle sensor, or the like. Furthermore, the sensing device 200 may be mounted into the front, the both sides, or the rear of the host vehicle.

Although not illustrated in FIG. 1, the vehicle system according to an exemplary embodiment of the present disclosure may further include a global positioning system (UPS) receiver configured to receive a GPS signal. The communication device 300 may be configured to perform vehicle to everything (V2X) communication between vehicles which are during platooning and share information for platooning between platooning vehicles.

The display 400 may be configured to display information received from vehicles which are platooning and a driving situation and path or the like of the host vehicle. When receiving a request to change a location from a leading vehicle, the display 400 may be configured to output or display the request. Particularly, a user may touch or otherwise manipulate the display 400 and approve to change the location. The display 400 may be implemented as a head-up display (HUD), a cluster, an audio video navigation (AVN), or the like. Furthermore, the display 400 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and/or a three-dimensional (3D) display. Some thereof may be implemented as transparent displays configured as a transparent type or a semi-transparent type to see the outside. Moreover, the display 400 may be implemented as a touchscreen including a touch panel to be used as an input device other than an output device.

Figure 2:
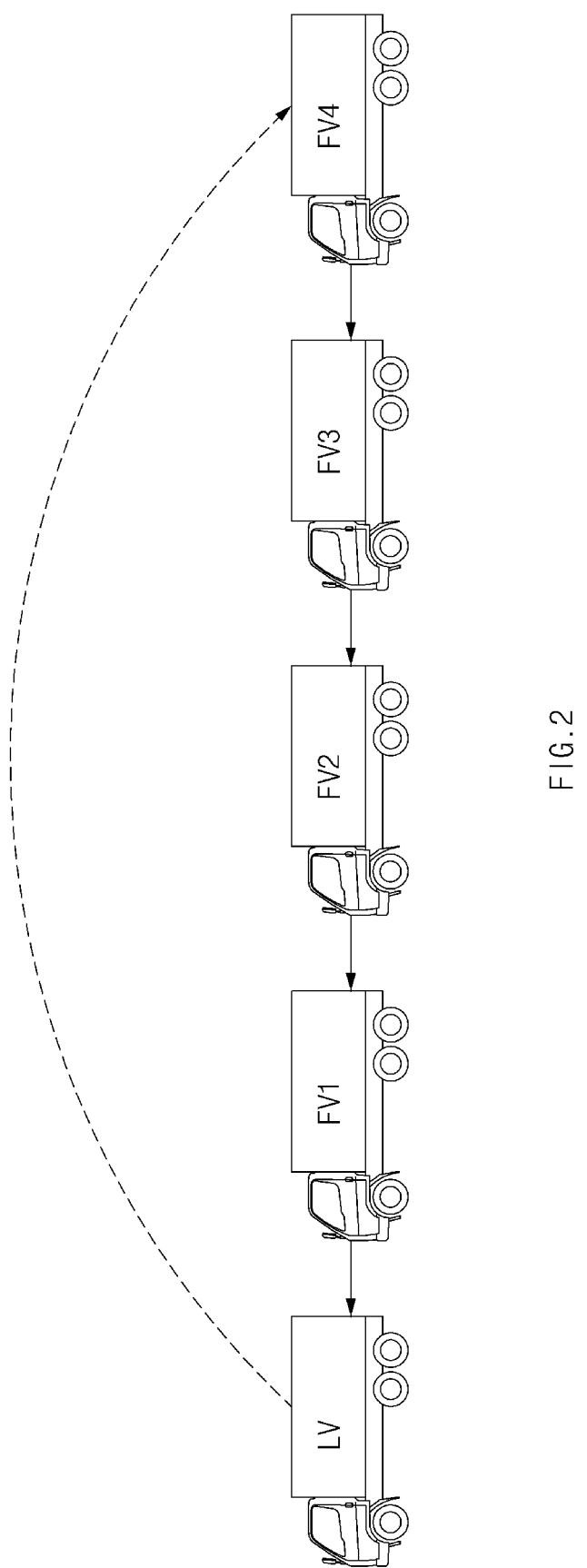
FIG. 2 is a drawing illustrating a platooning line according to an exemplary embodiment of the present disclosure.
Figure 3:
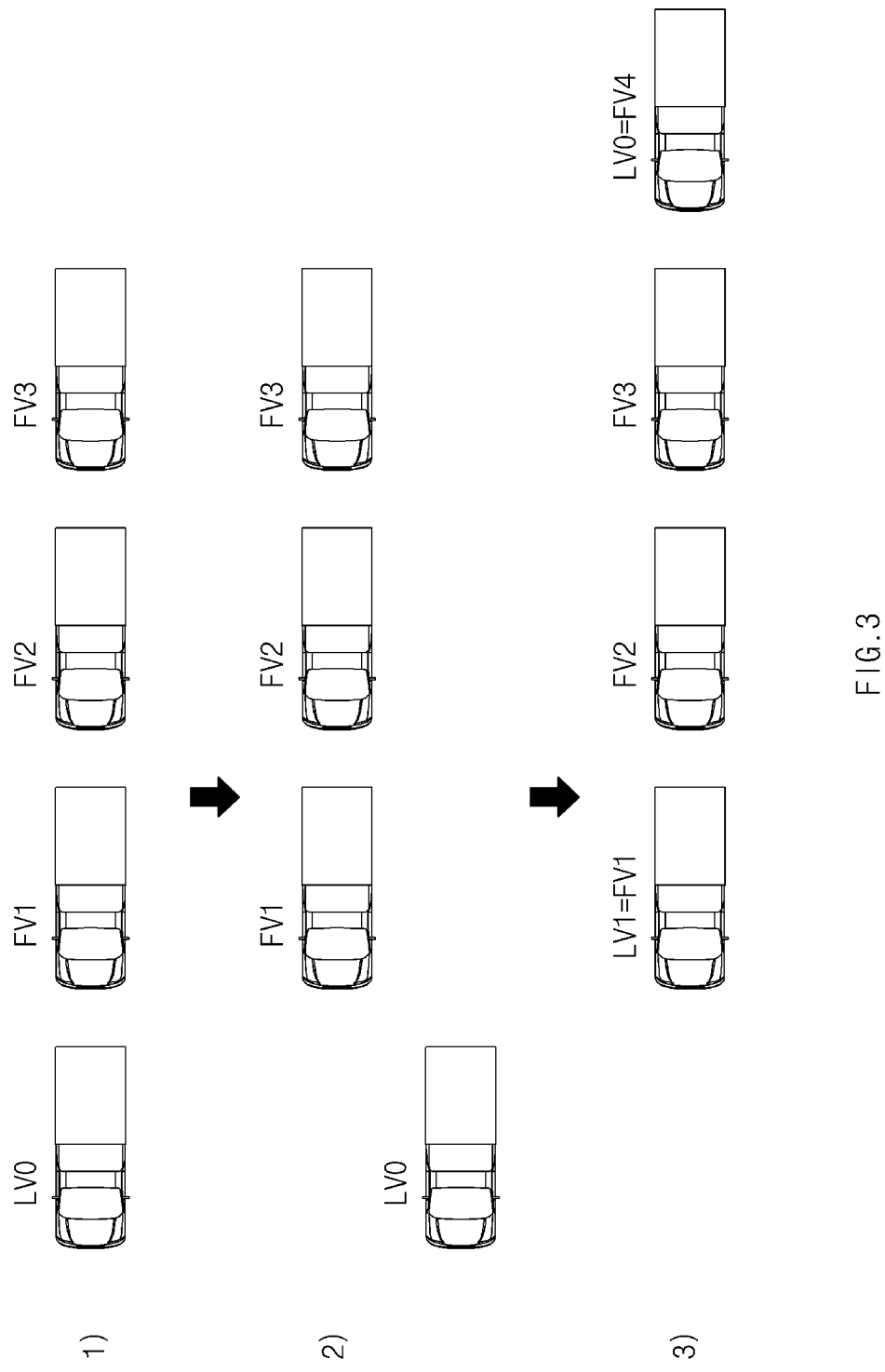
FIG. 3 is a drawing illustrating a process where a leading vehicle changes its location in a platooning line by a platooning management device, according to an exemplary embodiment of the present disclosure.

The navigation device 500 may provide a path to a platooning destination to the platooning management device 100 and provide the remaining distance to the destination to the platooning controller 100. FIG. 2 is a drawing illustrating a platooning line according to an exemplary embodiment of the present disclosure. FIG. 3 is a drawing illustrating a process where a leading vehicle changes its location in a platooning line by a platooning management device, according to an exemplary embodiment of the present disclosure.

Referring to FIG. 2, leading vehicle LV travels at the forefront of a platooning line, and following vehicles FV1, FV2, FV3, and FV4, which follow leading vehicle LV travel behind leading vehicle LV and perform platooning while sequentially maintaining a certain inter-vehicle distance. In particular, as leading vehicle LV travels at the forefront of the platooning line, since fuel efficiency of leading vehicle LV is reduced, a platooning management device 100 of leading vehicle LV may be configured to calculate driving costs of each of the leading vehicle LV and following vehicles FV1, FV2, FV3, and FV4, which are platooning, may be configured to score the driving costs, compare the driving costs of each of the following vehicles FV1, FV2, FV3, and FV4 with the driving costs of leading vehicle LV, and change a platooning location of each vehicle such that a following vehicle with relative small driving costs is moved to the location of the leading vehicle LV, thus equalizing consumed driving costs and minimizing the consumed driving costs.

Referring to FIG. 3, an exemplary embodiment is exemplified as following vehicle FV changes to the location of leading vehicle LV0 based on driving costs. In other words, leading vehicle LV0 may request the following vehicle FV1 to change a location of following vehicle FV1. When receiving approval to the request for changing the location from following vehicle FV1, leading vehicle LV0 may be moved to the tail end of a platooning line with regard to fuel efficiency, safety, and the like. Thus, following vehicle FV1 may be located on the forefront of the platooning line to become the new leading vehicle LV1.

In particular, leading vehicle LV0 may change a mode of following vehicle FV1 to a manual control mode in which a user of following vehicle FV1 directly drive the following vehicle FV1 (see reference numeral 1). Leading vehicle LV0 may change a driving lane in a user manual mode or an automatic driving mode to coast down (see reference numeral 2). Leading vehicle LV0 may move to the tail end of the platooning line to join the platooning line (see reference numeral 3).

Figure 4:
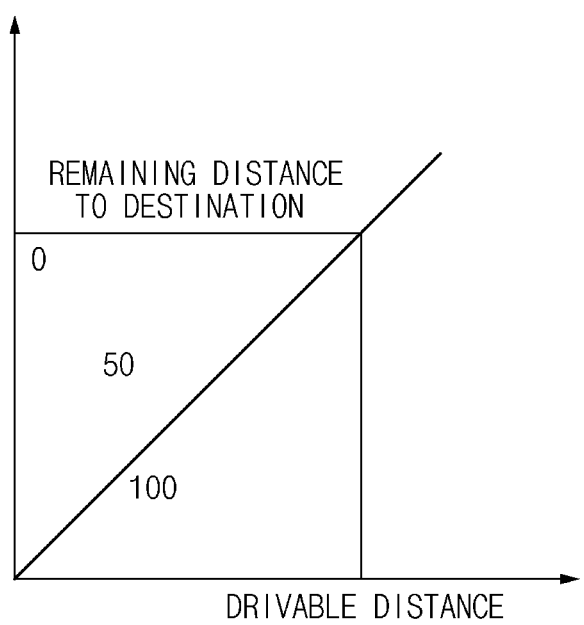
FIG. 4 is a drawing illustrating a process where a platooning management device calculates a level of emergency, according to an exemplary embodiment of the present disclosure.

FIG. 4 is a drawing illustrating a process where a platooning management device calculates a level of emergency, according to an exemplary embodiment of the present disclosure. Referring to FIG. 4, a platooning management device 100 of FIG. 1 may be configured to divide a drivable distance and the remaining distance to a destination, obtained from a navigation device 500 of FIG. 1, by a drivable distance determined based on the remaining fuel and may determine a level of emergency. For example, when the remaining distance (the distance to need driving) to the destination is about 3 km, when a driving distance with the current remaining fuel is about 2 km, and when the level of emergency becomes about 1.5, and when the level of emergency is greater than or equal to a predetermined numeric value, the platooning management device 100 may be configured to determine a current situation as an emergency situation to adjust a location of a leading vehicle as the tail end of a platooning line. In other words, the leading vehicle may be moved to the end of the platooning line to adjust the available amount of remaining fuel to thus be able to reach the destination. By moving to the end of the platooning line, the fuel efficiency is adjusted and thus the leading vehicle is capable of driving further than when in the leading vehicle position.

Figure 5:
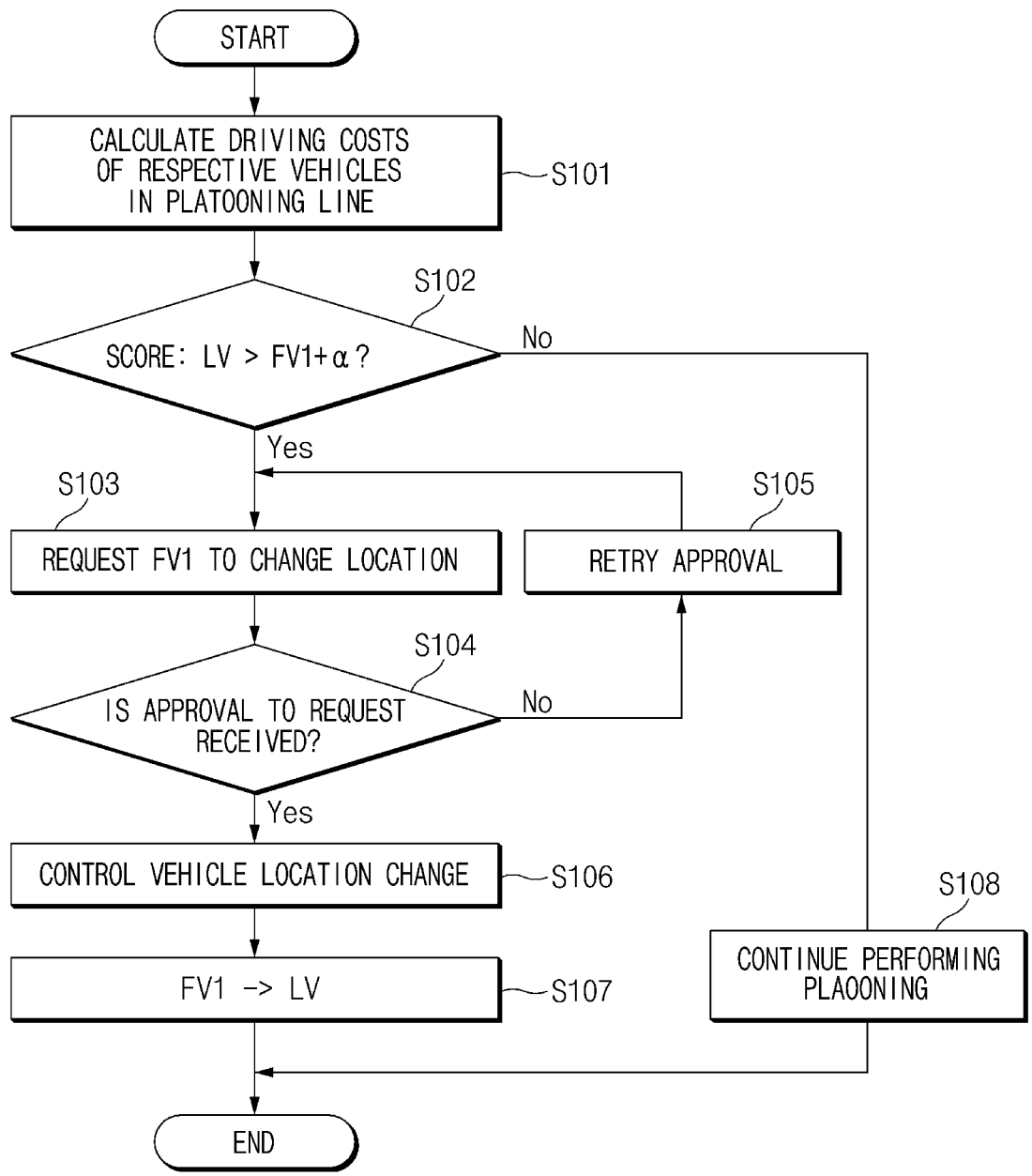
FIG. 5 is a flowchart illustrating a platooning management method according to an exemplary embodiment of the present disclosure.

Hereinafter, a description will be provided in detail of a platooning management method according to an exemplary embodiment of the present disclosure with reference to FIG. 5. FIG. 5 is a flowchart illustrating a platooning management method according to an exemplary embodiment of the present disclosure. It may be assumed that a platooning management device 100 of FIG. 1 performs a process of FIG. 5. Furthermore, an operation described as being performed by an apparatus may be understood as being controlled by a processor 130 of the platooning management device 100 mounted within leading vehicle LV.

Referring to FIG. 5, in S101, the apparatus mounted within each vehicle in a platooning line may be configured to calculate driving costs of each vehicle in the platooning line. In particular, the apparatus may be configured to calculate a level of contribution, a level of emergency, fuel costs (fuel efficiency), and risk and may be configured to calculate the driving costs of each vehicle based on the level of contribution, the level of emergency, the fuel costs (fuel efficiency), and the risk.

The apparatus may be configured to calculate a driving time for each location in the platooning line. Particularly, the apparatus may be configured to calculate a driving time at the location of a leading vehicle in the platooning line and calculate a level of contribution based on a driving time for each location of a vehicle in the platooning line. In other words, the level of contribution may be an index of determining how much each vehicle in the platooning line contributes, that is, how much or how long each vehicle travels at the location of a leading vehicle. The level of contribution may be an accumulated index and may use accumulation of the entire platooning time, and may be calculated as Equation 1 below.

The level of contribution=driving time at location of leading vehicle/the entire platooning time         Equation 1

The apparatus may further be configured to calculate a distance drivable with current fuel and calculate a level of emergency which is a degree of emergency situation. In other words, the apparatus may be configured to calculate a distance drivable with an amount of current fuel and receive a distance necessary to drive to a destination, calculated by a navigation device 500 of FIG. 1, from the navigation device 500. The apparatus may be configured to determine whether the amount of remaining fuel of the vehicle is sufficient and calculate a level of emergency based on the determined result. The level of emergency may be an index calculated while the vehicle participates in platooning and may be calculated as Equation 2 below.

The level of emergency=distance to need driving, received from navigation device,/distance drivable based on fuel         Equation 2

The apparatus may be configured to calculate an amount of used fuel per distance of each vehicle, determine fuel efficiency based on the calculated amount of used fuel, and operate a vehicle with relatively good fuel efficiency (e.g., sufficient fuel efficiency or greater than a predetermined threshold) to travel at the location of the leading vehicle. In particular, the fuel efficiency (e.g., the average amount of fuel) may be calculated as Equation 3 below.

The average amount of fuel=the amount of used fuel/platooning distance         Equation 3

Furthermore, the apparatus may be configured to evaluate a user state and qualification and calculate risk based on the evaluated user state and qualification. The user state may include whether a user drives while drowsy, whether the user establishes a call connection while driving, or the like. The user qualification may include a driving history, an accident history, or the like. In other words, the apparatus may be configured to score the risk based on the user state and the user qualification. For example, when the user drives while drowsy, the apparatus may be configured to set the risk to 1 point. When the user establishes a call connection while driving, the apparatus may be configured to set the risk to 2 points. When the driving history is lower, the apparatus may be configured to set the risk to 2 points. When the accident history of the user is greater than or equal to 2 times, the apparatus may be configured to set the risk to 3 points. When the number of penalties (e.g., penalty point according to the number of times of denying a request of a leading vehicle) is greater than or equal to 2 times, the apparatus may be configured to set the risk to 2 points. The apparatus may be configured to add scores of items based on the situation of the user to calculate the risk.

In S102, the apparatus may be configured to calculate a level of contribution, a level of emergency, fuel costs (fuel efficiency), and risk, calculate driving costs of each vehicle, and compare driving costs for each vehicle. In particular, the apparatus may be configured to add all of scores for the level of contribution, the level of emergency, the fuel costs (fuel efficiency), and the risk to calculate driving costs and add weights. For example, the driving costs may be calculated as Equation 4 below.

Driving costs=the level of contribution (25%)+the level of emergency (25%)+fuel costs (25%)+ risk (25%)         Equation 4

Particularly, a percentage of each item may be changed according to a weight, and the weight may be determined in advance by an experimental value. In FIG. 5, an exemplary embodiment is exemplified as driving costs of following vehicle FV1 are less than those of leading vehicle LV. The apparatus may be configured to compare the driving costs of leading vehicle LV with a value obtained by adding the driving costs of following vehicle FV1 to a specific value α. The specific value α may be preset by an experimental value. In other words, when the driving costs of leading vehicle LV are greater than those of following vehicle FV1 above a specific value (e.g., 10 points), the apparatus may be configured to request a location change (e.g., position change of the leading vehicle).

The apparatus may be configured to determine whether the driving costs of leading vehicle LV are greater than driving costs of each of following vehicles FV1, FV2, FV3, and FV4 which follow leading vehicle LV. When the driving costs of leading vehicle LV are less than driving costs of each of following vehicles FV1, FV2, FV3, and FV4 (e.g., when the driving costs of leading vehicle LV are less than or equal to the driving costs of each of following vehicles FV1, FV2, FV3, and FV4), in S108, the apparatus may be configured to continue performing platooning without changing the order of the current platooning line.

Meanwhile, when the driving costs of leading vehicle are greater than the value obtained by adding the driving costs of following vehicle FV1 to the specific value α, in S103, the apparatus of leading vehicle LV may be configured to request following vehicle FV1 to change a location or position of following vehicle FV1. In other words, in S104, the apparatus of leading vehicle LV may be configured to determine whether approval to the request for changing the location is received from following vehicle FV1. When the approval to the request for changing the location is not received from following vehicle FV1 during a predetermined of time, the apparatus of leading vehicle LV may be configured to request following vehicle FV1 again to change the location after a predetermined of time elapses.

In particular, when denial of the request is received above a predetermined number of times, in S105, the apparatus of the leading vehicle LV may be configured to compare the driving costs of leading vehicle LV with driving costs of each of the other following vehicles FV2, FV3, and FV4. The apparatus of the leading vehicle LV may be configured to request one of the other following vehicles FV2, FV3, and FV4 to change a location or position within the platoon line. Meanwhile, when receiving the approval for changing the location from following vehicle FV1 in S104, in S106, the apparatus of the leading vehicle LV may be configured to perform control for changing a location of leading vehicle LV to move the leading vehicle LV to the tail end of the platooning line.

Thus, in S107, following vehicle FV which is traveling immediately behind leading vehicle LV may be a new leading vehicle. Accordingly, an exemplary embodiment of the present disclosure may calculate driving costs of the current leading vehicle and respective vehicles, which are platooning, compare the driving costs of respective vehicles with the driving costs of the current leading vehicle, and adjust the location of the leading vehicle, thus, equally consuming the driving costs of all the vehicles which are the platooning.

Figure 6:
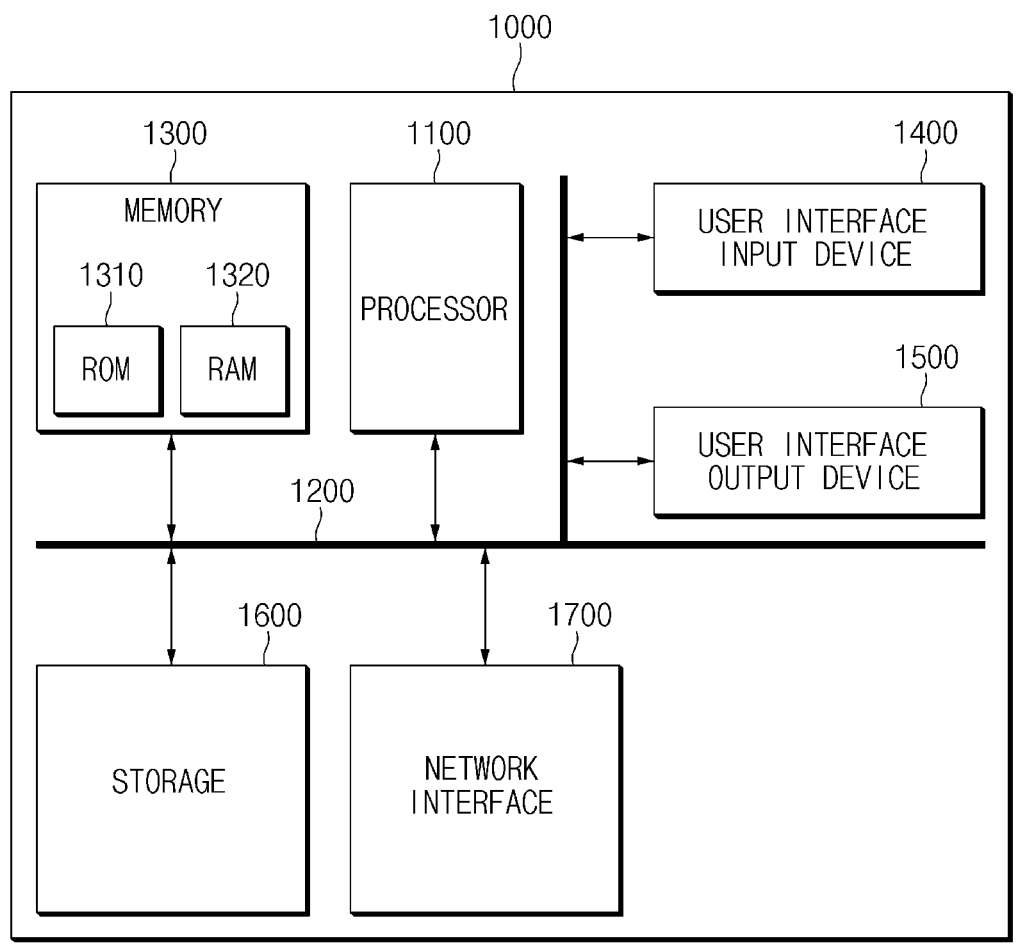
FIG. 6 is a block diagram illustrating a computing system according to an exemplary embodiment of the present disclosure.

FIG. 6 is a block diagram illustrating a computing system according to an exemplary embodiment of the present disclosure. Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may calculate driving costs of each of platooning vehicles and adjust platooning locations of the respective vehicles, thus equally spreading driving costs among the platooning vehicles. In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A platooning management device, comprising:
a processor configured to;
calculate driving costs of vehicles in a platooning line,
compare the driving costs of the vehicles to determine whether change of a location of a leading vehicle in the platooning line is necessary, and
perform location change control in response to determining change of the location of the leading vehicle is necessary; and
a storage configured to store driving costs obtained by the processor and information received from the vehicles in the platooning line,
wherein the processor is further configured to:
compare driving costs of the leading vehicle with driving costs of a following vehicle; and
request the following vehicle to change a driving location in the platooning line when the driving costs of the leading vehicle are greater than the driving costs of the following vehicle.

2. The platooning management device of claim 1, wherein the processor is configured to:
calculate a level of contribution of platooning, a level of emergency of the platooning, which is an emergency degree, fuel efficiency of the platooning, and risk of the platooning, and
calculate the driving costs based on at least one of the level of contribution, the level of emergency, the fuel efficiency, and the risk.

3. The platooning management device of claim 2, wherein the processor is configured to calculate the level of contribution of the platooning based on the entire platooning time and a driving time at the location of the leading vehicle.

4. The platooning management device of claim 2, wherein the processor is configured to calculate the level of emergency based on a distance drivable with current fuel of a host vehicle and a distance to a destination.

5. The platooning management device of claim 2, wherein the processor is configured to calculate the fuel efficiency based on a platooning distance and an amount of used fuel.

6. The platooning management device of claim 2, wherein the processor is configured to:
evaluate at least one or more of a user state, a user qualification, and a penalty; and
calculate the risk based on the evaluated result.

7. The platooning management device of claim 6, wherein the user state includes at least one of whether a user drives while drowsy and whether the user establishes a call connection while driving, the user qualification includes at least one or more of a user history and/or a user accident history, and the penalty includes a penalty point according to the number of times of denials of a request to drive at the location of the leading vehicle.

8. The platooning management device of claim 1, wherein the processor is configured to calculate the driving costs using a total score of each of a level of contribution, a level of emergency, fuel efficiency, and risk, the driving costs being calculated by assigning a weight for each item to the level of contribution, the level of emergency, the fuel efficiency, and the risk and adding the level of contribution, the level of emergency, the fuel efficiency, and the risk.

9. The platooning management device of claim 1, wherein the processor is configured to request the following vehicle again to change the driving location in the platooning line after a predetermined time interval elapses, when receiving a denial of the request to change the driving location in the platooning line from the following vehicle.

10. The platooning management device of claim 1, wherein the processor is configured to:
change a mode of the following vehicle to a user manual control mode when receiving approval to the request for changing the driving location in the platooning line from the following vehicle,
change a lane of the leading vehicle in a user manual mode or an automatic driving mode such that the leading vehicle coasts down, and
move the leading vehicle to the tail end of the platooning line to continue performing platooning.

11. A vehicle system, comprising:
a platooning management device configured to:
calculate driving costs of vehicles in a platooning line,
compare the driving costs of the vehicles to determine whether change of a location of a leading vehicle in the platooning line is necessary, and
perform location change control in response to determining change of the location is necessary; and
a display configured to display a screen for requesting to change the location:
wherein the platooning management device is further configured to:
compare driving costs of the leading vehicle with driving costs of a following vehicle; and
request the following vehicle to change a driving location in the platooning line when the driving costs of the leading vehicle are greater than the driving costs of the following vehicle.

12. The vehicle system of claim 11, further comprising:
a communication device configured to perform communication between the vehicles in the platooning line and share platooning information.

13. The vehicle system of claim 11, wherein the display is configured to receive approval via a user input through the screen for requesting to change the location.

14. A platooning management method, comprising:
calculating, by a processor, driving costs of vehicles in a platooning line;
comparing, by the processor, the driving costs of the vehicles to determine whether change of a location of a leading vehicle in the platooning line is necessary; and
performing, by the processor, location change control, in response to determining change of the location is necessary;
wherein the determining whether change of a location of a leading vehicle in the platooning line is necessary includes:
comparing, by the processor, driving costs of the leading vehicle with driving costs of a following vehicle; and
requesting, by the processor, the following vehicle to change a driving location in the platooning line, when the driving costs of the leading vehicle are greater than the driving costs of the following vehicle.

15. The platooning management method of claim 14, wherein the performing of the location change control when it is necessary to change the location includes:
requesting, by the processor, a following vehicle which consumes driving costs lower than driving costs of the leasing vehicle to change a location of the following vehicle; and
moving, by the processor, the leading vehicle to the tail end of the platooning line, when receiving approval to the request for changing the location from the following vehicle.

16. The platooning management method of claim 15, further comprising:
requesting, by the processor, the following vehicle again to change the driving location in the platooning line after a predetermined time interval elapses, when receiving a denial of the request for changing the location from the following vehicle.

17. The platooning management method of claim 15, wherein the moving of the leading vehicle to the tail end includes:
changing, by the processor, the following vehicle from an automatic mode to a user manual mode; and
changing, by the processor, a lane of the leading vehicle in a user manual mode or an automatic driving mode to control the leading vehicle to coast down.

18. The platooning management method of claim 14, wherein the calculating of the driving costs includes:
calculating, by the processor, a level of contribution of platooning based on the entire platooning time and a driving time at the location of the leading vehicle;
calculating, by the processor, a level of emergency based on a distance drivable with current fuel of a host vehicle and a distance to a destination;
calculating, by the processor, fuel efficiency based on a platooning distance and an amount of used fuel;
evaluating, by the processor, at least one or more of a user state, a user qualification, and a penalty and calculating risk based on the evaluated result; and
calculating, by the processor, the driving costs based on at least one or more of the level of contribution, the level of emergency, the fuel efficiency, and the risk.

* * * * *